(12) United States Patent
Teboulle

(10) Patent No.: US 11,991,264 B2
(45) Date of Patent: May 21, 2024

(54) MEASUREMENT TRANSMISSION METHOD ENABLING NETWORK LOADING TO BE REDUCED

(71) Applicant: SAGEMCOM ENERGY & TELECOM SAS, Rueil Malmaison (FR)

(72) Inventor: Henri Teboulle, Rueil Malmaison (FR)

(73) Assignee: SAGEMCOM ENERGY & TELECOM SAS, Rueil Malmaison (FR)

( * ) Notice: Subject to any disclaimer, the term of this patent is extended or adjusted under 35 U.S.C. 154(b) by 227 days.

(21) Appl. No.: 17/378,168

(22) Filed: Jul. 16, 2021

(65) Prior Publication Data

US 2022/0038561 A1 Feb. 3, 2022

(30) Foreign Application Priority Data

Jul. 29, 2020 (FR) .................................... 20 08048

(51) Int. Cl.
*H04L 29/06* (2006.01)
*G06F 7/499* (2006.01)
*H04L 67/12* (2022.01)
*H04L 69/22* (2022.01)

(52) U.S. Cl.
CPC .......... *H04L 69/22* (2013.01); *G06F 7/49942* (2013.01); *H04L 67/12* (2013.01)

(58) Field of Classification Search
CPC .................................................. G06F 7/49942
See application file for complete search history.

(56) References Cited

U.S. PATENT DOCUMENTS

| 2014/0307781 | A1* | 10/2014 | He ....................... H04N 19/463 375/240.03 |
| 2020/0196032 | A1 | 6/2020 | Schmitz et al. |
| 2021/0195632 | A1* | 6/2021 | Jungnickel .......... H04W 74/008 |
| 2021/0211739 | A1* | 7/2021 | Andreopoulos ..... H04N 19/103 |
| 2023/0308653 | A1* | 9/2023 | Choi ..................... H04N 19/46 |

* cited by examiner

*Primary Examiner* — John D Blanton
(74) *Attorney, Agent, or Firm* — MUNCY, GEISSLER, OLDS & LOWE, P.C.

(57) ABSTRACT

A transmission method for transmitting measurements is taken by a fluid meter during successive measurement periods, each subdivided into successive time intervals. The measurements comprise first measurements, each representative of a quantity of fluid distributed during a respective one of the time intervals. The transmission method includes, for each measurement period, the step of producing and then transmitting at least one measurement frame such that: when the number of first measurements that are equal to zero is strictly less than a predetermined number during said measurement period, then the measurement frame is a normal measurement frame; otherwise the measurement frame is a compact measurement frame that, when there is at least one first measurement that is not equal to zero, comprises both preliminary data comprising identification data for identifying active time intervals and also compact first measurement data comprising only said non-zero first measurements ordered in a predefined order.

11 Claims, 2 Drawing Sheets

MEASUREMENT TRANSMISSION METHOD ENABLING NETWORK LOADING TO BE REDUCED

The invention relates to the field of smart fluid meters.

BACKGROUND OF THE INVENTION

A modern water meter, also known as a "smart" water meter, naturally includes a measurement module for measuring the water consumption of a water installation, and it also includes a processor module and a communication module.

The processor module enables the water meter to perform a certain number of functions, and in particular to analyze various kinds of data, e.g. relating to the water consumption of the installation, to the billing of the customer, to the state of the water distribution network, or indeed to the operation of the water meter itself.

The communication module enables the water meter to communicate with an information system (IS) of the network manager, possibly via a data concentrator, a gateway, or indeed another meter (such as a district smart meter). The communication module may perform any type of communication, and for example communication via a cellular network of 2G, 3G, 4G, Cat-M, or NB-IoT type, communication using the long range (LoRa) protocol, radio communication using the Wize standard operating at the frequency of 169 megahertz (MHz), etc.

Each day j, a water meter transmits at least one measurement frame to the IS. Like every other day, the day j is subdivided into successive time intervals, each having a duration of one hour.

The "payload" of the measurement frame (i.e. the portion of the measurement frame contains the data that it is useful to transmit), e.g. a reference index written herein as $C_j$, together with 23 increments or "deltas" written herein as $\Delta_{j\_1}$ to $\Delta_{j\_23}$.

The reference index $C_j$ is a measurement representative of the quantity of water that has been distributed via the pipe to which the water meter is connected up to the beginning of the day j.

In this example, each index delta $\Delta_{j\_k}$ is a measurement of the quantity of water that was distributed during the $(k+1)^{th}$ time interval of the day j. In this example, the index delta corresponding to the first time interval (between midnight and 1 AM) is not transmitted.

Thus, by way of example, between 2 AM and 3 AM, i.e. during the third time interval of the day j (during the third hour of the day j), the water meter measures that a quantity of water equal to $\Delta_{j\_2}$ was distributed via the pipe to which it is connected.

The payload of such a measurement frame is fifty 8-bit bytes or "octets": four octets for the reference index and two octets for each of the 23 index deltas $\Delta_{j\_1}$ to $\Delta_{j\_23}$.

OBJECT OF THE INVENTION

An object of the invention is to limit the loading on a network to which smart meters are connected.

SUMMARY OF THE INVENTION

In order to achieve this object, there is provided a transmission method for transmitting measurements taken by a fluid meter during successive measurement periods, each subdivided into successive time intervals, the measurements comprising first measurements, each representative of a quantity of fluid distributed during a respective one of the time intervals, the transmission method comprising, for each measurement period, the step of producing and then transmitting at least one measurement frame such that:

when the number of first measurements that are equal to zero is strictly less than a predetermined number during said measurement period, then the measurement frame is a normal measurement frame comprising normal first measurement data comprising all of the first measurements of said measurement period;

otherwise the measurement frame is a compact measurement frame that, when there is at least one first measurement that is not equal zero, comprises:

preliminary data comprising identification data for identifying active time intervals of said measurement period, which active time intervals are associated with respective non-zero first measurements;

compact first measurement data comprising only said non-zero first measurements ordered in a predefined order.

Thus, when the transmission method of the invention is performed for a given measurement period, a compact measurement frame is sent whenever a certain number of first measurements are equal to zero during said given measurement period. The compact measurement frames contain identification data for identifying the active time intervals and (only) the first measurements that are not equal to zero. The length of the compact measurement frames is thus considerably shorter than the length of normal measurement frames. This optimization of measurement frame length serves to reduce loading on the network in significant manner.

There is also provided a transmission method as described above, wherein the measurement frame includes second measurement data comprising a second measurement representative of the quantity of fluid distributed up to the beginning of said measurement period, the second data further comprising a mode bit positioned in a first predefined position that presents a first predefined value when the measurement frame is a normal measurement frame and that presents a second predefined value when the measurement frame is a compact measurement frame.

There is also provided a transmission method as described above, wherein the mode bit is the most significant bit of at least one octet containing the second measurement data.

There is also provided a transmission method as described above, wherein the preliminary data of the compact measurement frame comprises an activity bit that is positioned in a second predefined position that presents a third predefined value when all of the first measurements are equal to zero and that presents a fourth predefined value when at least one first measurement is not equal to zero.

There is also provided a transmission method as described above, wherein the activity bit is the most significant bit of at least one octet containing the preliminary data.

There is also provided a transmission method as described above, wherein the identification data comprises identification bits, each associated with a respective time interval, the identification bits following one another in chronological order of the time intervals, each identification bit associated with a time interval presents a fifth predefined value when said time interval is an active time interval associated with a first measurement that is not equal to zero and presents a sixth predefined value when said time interval is an inactive time interval associated with a first measurement that is equal to zero.

There is also provided a transmission method as described above, wherein the chronological order begins with the least significant bit and ends with the most significant bit of at least one octet containing the identification data.

There is also provided a transmission method as described above, wherein the preliminary data presents a reduced length when all of the first measurements are equal to zero.

There is also provided a transmission method as described above, wherein each measurement period has a duration of one day, and wherein each time interval has a duration of one hour.

There is also provided a fluid meter arranged to perform the transmission method as described above, the fluid meter comprising a measurement module for taking the first measurements, a processor module for producing the measurement frames, and a communication module for transmitting the measurement frames.

There is also provided a computer program including instructions for causing the above-described fluid meter to execute the steps of the above-described transmission method.

There is also provided a computer readable storage medium, having stored thereon the above-described computer program.

The invention can be better understood in the light of the following description of a particular, nonlimiting embodiment of the invention.

BRIEF DESCRIPTION OF THE DRAWINGS

Reference is made to the accompanying drawings, in which.

DETAILED DESCRIPTION OF THE INVENTION

Figure 1:
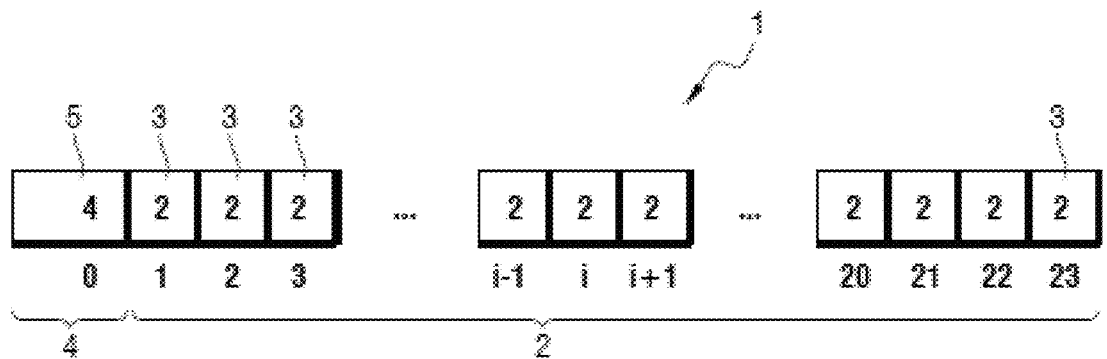
FIG. 1 shows a normal measurement frame.

In this example, the transmission method of the invention is for transmitting measurement frames containing measurements taken by a water meter.

The water meter comprises a measurement module, a processor module, and a communication module.

The measurement module serves to measure water consumption. By way of example, the measurement module may be a measurement module that is ultrasonic or mechanical.

The processor module acquires the measurements and produces the measurement frames. By way of example, the processor module may comprise a processor, a microcontroller, or indeed a programmable logic circuit such as a field programmable gate array (FPGA) or an application-specific integrated circuit (ASIC).

The communication module serves to transmit the measurement frames, and for this purpose it comprises a transmitter or a transceiver suitable for performing communication that may be of any type (e.g. communication via a cellular network, communication using the LoRa protocol, radio communication using the Wize standard, etc.).

By way of example, in this description, the measurement frames are in the frame format of the LoRa protocol.

The water meter takes the water consumption measurements using a process that is repeated in successive measurement periods, each of which is subdivided into successive time intervals. In this example, each measurement period has a duration of one day, and each time interval has a duration of one hour.

Every day, the water meter transmits a measurement frame in which the payload contains both first measurement data and second measurement data. The first measurement data comprises first measurements, which are the index deltas, while the second measurement data comprises a second measurement, which is the reference index.

It is relatively common for the water consumption of an installation to be zero during rather long periods within a given day. By way of example, this applies at night, or indeed on weekdays when the parents of a family are at work and the children are at school. During these periods of no water consumption, the index deltas are zero and the consumption index does not change.

In order to reduce loading on the network, the invention consists in not transmitting index deltas when they are equal to zero (under certain conditions). Only non-zero information is transmitted: load curve information is not transmitted and is thus implied.

Measurements are transmitted in two distinct modes: a normal mode and a compact mode.

During a given day, the normal mode is used if the number of index deltas that are equal to zero is strictly less than some predetermined number (i.e. if the given day has few periods of zero consumption).

If this condition is not true, then the compact mode is used.

In this example, the predetermined number is equal to two. Thus, when only one index delta of the given day is equal to zero, then the normal mode is used. When the number of index deltas that are equal to zero is greater than or equal to two, then the compact mode is used.

Naturally, the predetermined number may be other than two, and by way of example it could be equal to one, such that the compact mode is used once at least one index delta is equal to zero.

In order to distinguish between a normal measurement frame and a compact measurement frame, use is made of a mode bit.

The mode bit is positioned in the measurement frame at a predefined first position. The mode bit presents a first predefined value when the measurement frame is a normal measurement frame, and a second predefined value when the measurement frame is a compact measurement frame. It is thus possible, on receiving the measurement frame, to know whether said measurement frame is a normal measurement frame or a compact measurement frame.

In this example, the mode bit is the most significant bit of at least one octet containing the second measurement data. The mode bit is thus included in the octets encoding the reference index.

The second measurement data comprises four octets, on which the reference index is encoded. The most significant bit is the most significant bit of the left octet (i.e. the most significant octet) of the four octets of the second measurement data.

Specifically, in decimal, the maximum value of the reference index corresponds to 999999999 and thus in hexadecimal it corresponds to 3B9AC9FF. The most significant bit is thus available for performing this role.

In this example, the first predefined value is equal to 0 and the second predefined value is equal to 1.

In normal mode (mode bit equal to 0), and with reference to FIG. 1, the measurement frame that is sent is thus a normal measurement frame 1. The first measurement data is thus normal first measurement data 2 comprising all of the index deltas 3 for the given day, i.e. in this example the 23 index deltas 3. Each index delta 3 is encoded on two octets.

The second measurement data 4 comprises the reference index 5 and the mode bit, which is equal to 0.

The payload of the normal measurement frame thus comprises fifty octets: four octets, on the left, for the second measurement data 4, these four octets encoding the reference index 5 and including the mode bit, followed by two octets for each index delta 3 for the normal first measurement data 2. The pairs of octets of the normal first measurements 2, encoding the index deltas 3, follow one another from left to right in chronological order of the time intervals associated with the index deltas.

The term "follow one another . . . in chronological order of the time intervals" is used to mean that the pairs of octets encoding the index deltas follow one another in the chronological order of arrival of the time intervals associated with the index deltas: the pair of octets encoding the index delta associated with the $2^{nd}$ time interval (from 1 AM to 2 AM) is followed (from left to right) by the pair of octets encoding the index delta associated with the $3^{rd}$ time interval (from 2 AM to 3 AM), which is followed by the pair of octets encoding the delta associated with the $4^{th}$ time interval (from 3 AM to 4 AM), which is followed by the pair of octets encoding the index delta associated with the $5^{th}$ time interval (from 4 AM to 5 AM) etc.

The payload of the normal measurement frame 1 corresponds to the standard structure for the payload of a load curve frame (with the most significant bit of the octets encoding the reference index at 0).

In the compact mode (mode bit equal to 1), the measurement frame is a compact measurement frame.

Figure 2:
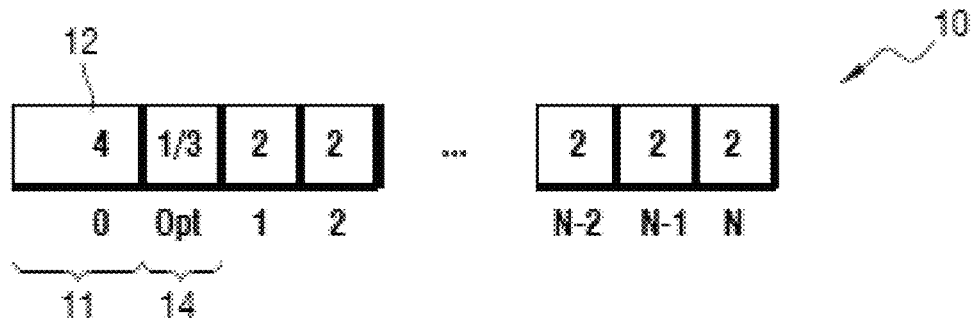
FIG. 2 shows a compact measurement frame.

With reference to FIG. 2, the compact measurement frame 10 comprises second measurement data 11 similar to the measurement data of the normal measurement frame 1 (except that the mode bit is equal to 1 and not to 0) and including the reference index 12.

Thereafter, the compact measurement frame 10 comprises preliminary data 14.

Two situations can occur: all of the index deltas of the given day are equal to zero, or else at least one index delta is not equal to zero.

The preliminary data 14 of the compact measurement frame 10 comprises an activity bit that is positioned at a second predefined position and that presents a third predefined value when all of the index deltas are equal to zero, and a fourth predefined value when at least one index delta is not equal to zero.

In this example, the activity bit is the most significant bit of at least one octet containing the preliminary data 14.

The third predefined value is equal to 0 and the fourth predefined value is equal to 1.

The preliminary data 14 presents a length that is short when all of the index deltas are zero (and otherwise a length that is normal).

The normal length for the preliminary data 14 is three octets, and the short length is one octet.

The activity bit is the most significant bit of the left octet (the most significant octet) of the single octet or of the three octets of the preliminary data 14.

Figure 3:
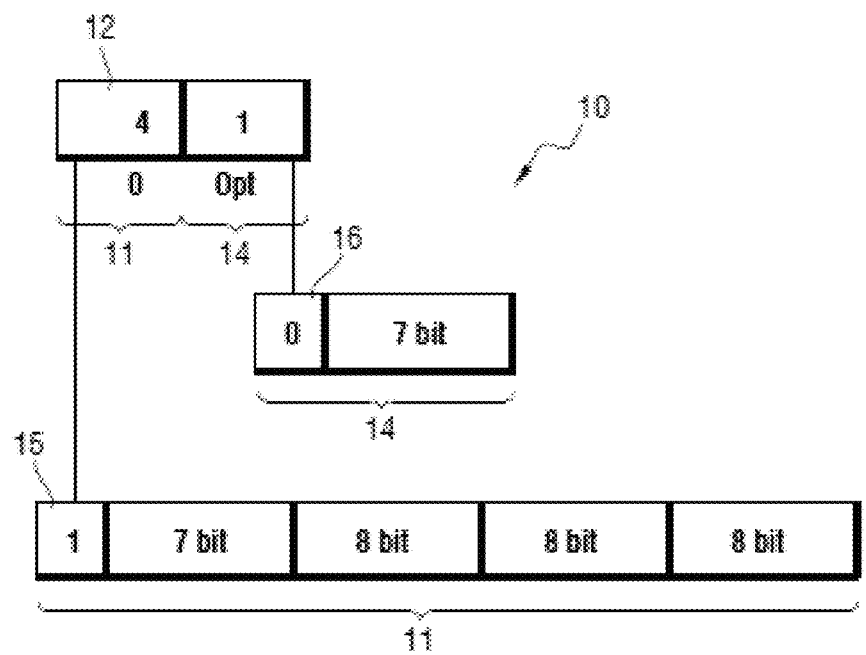
FIG. 3 shows a compact measurement frame when all of the first measurements are equal to zero.

With reference to FIG. 3, when all of the index deltas are equal to zero, the payload of the compact measurement frame 10 thus comprises only five octets instead of the fifty octets that would have been used if the invention were not implemented: four octets for the second measurement data 11 and one octet for the preliminary data 14.

The four octets of the second measurement data 11 include the mode bit 15, which is equal to 1 and which is therefore followed by 7 bits, then by three octets of 8 bits each (in order to encode the reference index 12).

The preliminary data octet 14 includes the activity bit 16, which is equal to 0 and which is thus followed by 7 bits.

Figure 4:
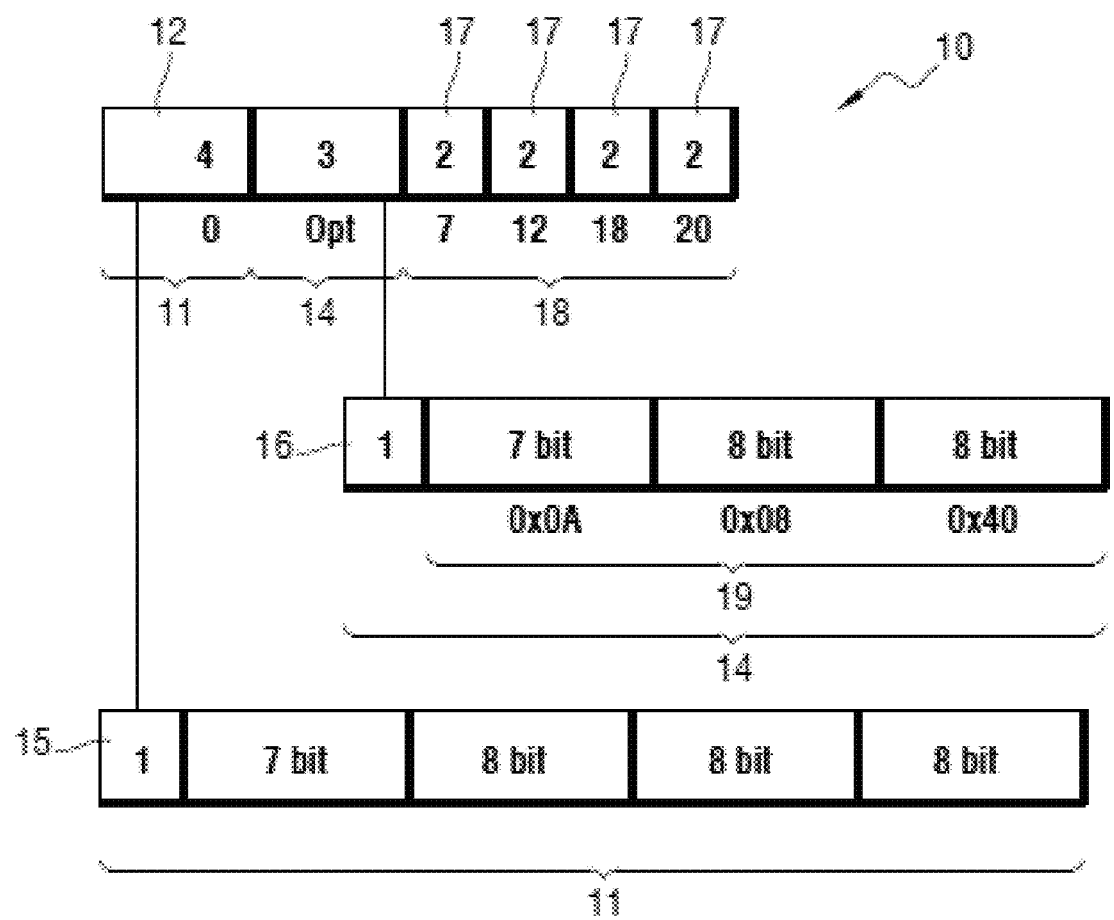
FIG. 4 shows a compact measurement frame when one or more of the first measurements are not equal to zero.

With reference to FIG. 4, when at least one index delta is not equal to zero, the payload of the compact measurement frame 10 comprises four octets for the second measurement data 11, three octets for the preliminary data 14, and two octets for each non-zero index delta 17 for the compact first measurement data 18.

The preliminary data 14 comprises identification data 19 for identifying active time intervals of the given day, which data is associated with the non-zero index deltas. A distinction is thus made between active time intervals during which water consumption was not zero, and inactive time intervals during which water consumption was zero.

The identification data 19 comprises identification bits, each identification bit being associated with a time interval. The identification bits follow one another in chronological order of the time intervals, each identification bit associated with a time interval presenting a fifth predefined value when said time interval is an active time interval associated with a respective non-zero index delta, and a sixth predefined value when said time interval is an inactive time interval associated with a respective zero index delta.

In this example, the fifth predefined value is equal to 1 and the sixth predefined value is equal to 0: this means that the identification bit of an active time interval is equal to 1 and the identification bit of an inactive time interval is equal to 0.

The chronological order begins with the least significant bit of at least one octet containing the identification data. The identification data 19 comprises two octets plus seven bits (the remaining bit of the third octet of the preliminary data 14 being the activity bit 16, which is equal to 1 in this example).

Example of FIG. 4, the identification bits have the following hexadecimal values: 0x0A, 0x08, 0x40, i.e. the following binary values: 000 1010 0000 1000 0100 0000.

Using chronological order and starting from the least significant bit (on the right), it can thus be seen that the $7^{th}$ bit, the $12^{th}$ bit, the $18^{th}$ bit, and the $20^{th}$ bit of the identification bits are equal to 1, which means that the $7^{th}$, $12^{th}$, $18^{th}$, and $20^{th}$ index deltas are non-zero (and thus that the 8th, $13^{th}$, $19^{th}$, and $21^{st}$ time intervals of the given day are active).

The payload of the compact measurement frame 10 then comprises the compact first measurement data 18, which comprises only the non-zero index deltas 17 that are associated with the active time intervals. Each non-zero index delta 17 is encoded by a pair of octets. The index deltas that are equal to zero and for which the identification bit is zero are not transmitted.

The non-zero index deltas 17 are ordered in a predefined order.

Once again, the predefined order is chronological order.

The pairs of octets associated with the non-zero index deltas 17 follow one another from left to right in chronological order of the time intervals associated with the index deltas: the octet pair encoding the $7^{th}$ index delta is followed (from left to right) by the octet pair encoding the $12^{th}$ index delta, which is followed by the octet pair encoding the $18^{th}$ index delta, which is followed by the octet pair encoding the $20^{th}$ index delta.

In this example, the payload of the compact measurement frame 10 thus comprises fifteen octets instead of the fifty octets that would have been used if the invention were not implemented.

Naturally, the invention is not limited to the embodiment described, but covers any variant coming within the ambit of the invention as defined by the claims.

The measurement periods need not necessarily be days, at the time intervals need not necessarily be hours.

The measurements transmitted by the transmission method of the invention need not necessarily be measurements taken by a water meter, but they could be measurements taken by a meter for some other fluid: a gas meter, a heat meter, an oil meter, etc.

It should be observed that the measurement frames comprising the measurements taken by the fluid meter may be produced and transmitted by the fluid meter that takes the measurements (as in the present description), or they could be produced and transmitted by some other entity that has received said measurements: a data concentrator, a gateway, another meter, etc.

The invention claimed is:

1. A transmission method for transmitting measurements taken by a fluid meter during successive measurement periods, each subdivided into successive time intervals, the measurements comprising first measurements, each representative of a quantity of fluid distributed during a respective one of the time intervals, the transmission method comprising, for each measurement period, the step of producing and then transmitting at least one measurement frame such that:
   when the number of first measurements that are equal to zero is strictly less than a predetermined number during said measurement period, then the measurement frame is a normal measurement frame comprising normal first measurement data comprising all of the first measurements of said measurement period;
   otherwise the measurement frame is a compact measurement frame that, when there is at least one first measurement that is not equal to zero, comprises:
      preliminary data comprising identification data for identifying active time intervals of said measurement period, which active time intervals are associated with respective non-zero first measurements;
      compact first measurement data comprising only said non-zero first measurements ordered in a predefined order.

2. The transmission method according to claim 1, wherein the measurement frame includes second measurement data comprising a second measurement representative of the quantity of fluid distributed up to the beginning of said measurement period, the second measurement data further comprising a mode bit positioned in a first predefined position and presenting a first predefined value when the measurement frame is a normal measurement frame or presenting a second predefined value when the measurement frame is a compact measurement frame.

3. The transmission method according to claim 2, wherein the mode bit is the most significant bit of at least one octet containing the second measurement data.

4. The transmission method according to claim 1, wherein the preliminary data of the compact measurement frame comprise an activity bit positioned in a second predefined position and presenting a third predefined value when all of the first measurements are equal to zero, or presenting a fourth predefined value when at least one first measurement is not equal to zero.

5. The transmission method according to claim 4, wherein the activity bit is the most significant bit of at least one octet containing the preliminary data.

6. The transmission method according to claim 1, wherein the identification data comprise identification bits, each associated with a respective time interval, the identification bits following one another in chronological order of the time intervals, each identification bit associated with a time interval presenting a fifth predefined value when said time interval is an active time interval associated with a non-zero first measurement that is not equal to zero, or presenting a sixth predefined value when said time interval is an inactive time interval associated with a first measurement that is equal to zero.

7. The transmission method according to claim 6, wherein the chronological order begins with the least significant bit and ends with the most significant bit of at least one octet containing the identification data.

8. The transmission method according to claim 1, wherein the preliminary data present a reduced length when all of the first measurements are equal zero.

9. The transmission method according to claim 1, wherein each measurement period has a duration of one day, and wherein each time interval has a duration of one hour.

10. A fluid meter that transmits measurements during successive measurement periods, each subdivided into successive time intervals, the fluid meter comprising:
    a measurement module for taking first measurements, each representative of a quantity of fluid distributed during a respective one of the time intervals,
    a processor module for producing measurement frames, and
    a communication module for transmitting the measurement frames,
    wherein, for each measurement period, at least one measurement frame is produced and then transmitted such that:
    when a number of the first measurements that are equal to zero is strictly less than a predetermined number during said measurement period, then the measurement frame is a normal measurement frame comprising normal first measurement data comprising all of the first measurements of said measurement period;
    otherwise the measurement frame is a compact measurement frame that, when there is at least one first measurement that is not equal to zero, comprises:
       preliminary data comprising identification data for identifying active time intervals of said measurement period, which active time intervals are associated with respective non-zero first measurements;
       compact first measurement data comprising only said non-zero first measurements ordered in a predefined order.

11. A non-transitory computer readable storage medium having stored thereon a computer program including instruction for causing the fluid meter to execute the transmission method according to claim 1.

* * * * *